United States Patent
Ichikawa

(10) Patent No.: US 8,091,343 B2
(45) Date of Patent: Jan. 10, 2012

(54) EXHAUST GAS PURIFICATION APPARATUS FOR INTERNAL COMBUSTION ENGINE

(75) Inventor: Ataru Ichikawa, Kariya (JP)

(73) Assignee: Denso Corporation, Kariya (JP)

( * ) Notice: Subject to any disclaimer, the term of this patent is extended or adjusted under 35 U.S.C. 154(b) by 435 days.

(21) Appl. No.: 12/490,494

(22) Filed: Jun. 24, 2009

(65) Prior Publication Data

US 2010/0024401 A1 Feb. 4, 2010

(30) Foreign Application Priority Data

Jul. 29, 2008 (JP) ................................ 2008-194398

(51) Int. Cl.
*F01N 3/00* (2006.01)
(52) U.S. Cl. ............... 60/286; 60/274; 60/285; 60/295; 60/300; 60/301
(58) Field of Classification Search .................. 60/274, 60/284–287, 295–301
See application file for complete search history.

(56) References Cited

U.S. PATENT DOCUMENTS

| | | | |
|---|---|---|---|
| 6,079,203 A * | 6/2000 | Wakamoto | 60/274 |
| 6,996,975 B2 * | 2/2006 | Radhamohan et al. | 60/286 |
| 7,334,400 B2 * | 2/2008 | Yan et al. | 60/286 |
| 7,861,516 B2 | 1/2011 | Allansson et al. | |
| 7,942,043 B2 * | 5/2011 | Liu et al. | 73/114.75 |
| 2007/0160508 A1 | 7/2007 | Doumeki et al. | |
| 2007/0180816 A1 * | 8/2007 | Masuda et al. | 60/274 |
| 2007/0277507 A1 * | 12/2007 | Yan | 60/286 |
| 2009/0272101 A1 * | 11/2009 | Wills et al. | 60/286 |
| 2011/0083429 A1 * | 4/2011 | Sato et al. | 60/299 |

FOREIGN PATENT DOCUMENTS

| | | |
|---|---|---|
| JP | 2003-314256 | 11/2003 |
| JP | A-2006-527815 | 12/2006 |
| JP | A-2007-162487 | 6/2007 |
| JP | 2007-315235 | 12/2007 |
| JP | A-2007-315235 | 12/2007 |
| JP | A-2008-502844 | 1/2008 |
| WO | WO 2004/113691 | 12/2004 |
| WO | WO 2005/124115 | 12/2005 |

OTHER PUBLICATIONS

Japanese Office Action dated Apr. 27, 2010, issued in corresponding Japanese Application No. 2008-194398, with English translation.

* cited by examiner

*Primary Examiner* — Thomas Denion
*Assistant Examiner* — Jesse Bogue
(74) *Attorney, Agent, or Firm* — Nixon & Vanderhye PC

(57) ABSTRACT

An exhaust pipe is provided with a SCR catalyst (NOx catalyst) and an oxidation catalyst. A urea water adding valve and an exhaust gas temperature sensor are provided upstream of the SCR catalyst. A downstream NOx sensor is provided downstream of the SCR catalyst. The oxidation catalyst is provided with a catalyst temperature sensor. An ECU computes a temperature of the oxidation catalyst based on a detection value of the catalyst temperature sensor. Further, the ECU computes a temperature of exhaust gas flowing into the oxidation catalyst based on a detection value of the exhaust gas temperature sensor. The ECU detects ammonia flowing out from the SCR catalyst based on a differential temperature between the temperature of the catalyst and the temperature of the exhaust gas.

6 Claims, 4 Drawing Sheets

EXHAUST GAS PURIFICATION APPARATUS FOR INTERNAL COMBUSTION ENGINE

CROSS-REFERENCE TO RELATED APPLICATION

This application is based on Japanese Patent Application No. 2008-194398 filed on Jul. 29, 2008, the disclosure of which is incorporated herein by reference.

FIELD OF THE INVENTION

The present invention relates to an exhaust gas purification apparatus. The present invention is preferably applied to an exhaust gas purification system provided with a selective catalytic reduction (SCR) which selectively purifies nitrogen oxide (NOx) in exhaust gas by ammonia as reducer. Generally, urea aqueous solution (urea water) is used as reducer in this system. Thus, this system has been known as urea SCR system.

BACKGROUND OF THE INVENTION

A urea SCR system has been developed as an exhaust gas purification system for an engine (especially, diesel engine). The urea SCR system has a selective reduction type NOx catalyst and an oxidation catalyst in an exhaust pipe in this series. A urea water adding valve is provided upstream of the NOx catalyst to add urea water into the exhaust pipe. The urea water is hydrolyzed by exhaust heat to generate ammonia (NH3). The NOx catalyst adsorbs the ammonia. The NOx is purified by reductive reaction between ammonia and NOx on the NOx catalyst.

As shown in FIG. 2, a limit value of ammonia adsorption quantity varies according to NOx catalyst temperature. The limit value of ammonia adsorption quantity becomes small as the NOx catalyst temperature increases. Thus, when the NOx catalyst temperature increases, a limit value of ammonia adsorption quantity becomes small so that excess ammonia flows out from the NOx catalyst. The oxidation catalyst oxidizes the excess ammonia. The oxidation catalyst degrades the ammonia into nitrogen (N2) and water (H2O).

However, when ammonia quantity flowing out from the NOx catalyst, which is referred to as ammonia slip quantity, excess a capacity of the oxidation catalyst, the oxidation reaction in the oxidation catalyst is saturated. Then, the ammonia flows out from the oxidation catalyst and is released into the atmosphere. Besides, in the urea SCR system, a NOx sensor detecting NOx quantity (NOx concentration) is disposed between the NOx catalyst and the oxidation catalyst. If the ammonia flows out from the NOx catalyst, the NOx sensor outputs an erroneous signal. That is, NOx sensor detects not only NOx but also ammonia. Thus, when the ammonia flows out from the NOx catalyst, the NOx sensor outputs a detection signal indicative of NOx quantity which is larger than an actual NOx quantity in exhaust gas.

In a system shown in JP-2007-162487A (US-2007-0160508A1), when the NOx catalyst temperature exceeds a specified temperature in which the ammonia starts to desorb from the NOx catalyst, an addition of the urea water by the urea water adding valve is stopped Thereby, it is restricted that ammonia flows out from the NOx catalyst.

However, since the temperature in which the ammonia starts to desorb from the NOx catalyst varies according to the ammonia adsorption quantity, a computation of the ammonia adsorption quantity is necessary. In order to compute the ammonia adsorption quantity, a urea water adding quantity, NOx quantity flowing into the NOx catalyst and NOx quantity flowing out from the NOx catalyst should be identified. These quantities include error. Thus, it can not correctly detect whether ammonia flows out from the NOx catalyst.

SUMMARY OF THE INVENTION

The present invention is made in view of the above matters, and it is an object of the present invention to provide an exhaust gas purification apparatus which can correctly detects a reducer flowing out from the NOx catalyst.

According to the present invention, an exhaust gas purification apparatus is applied to an exhaust purification system including a NOx catalyst adsorbing a reducer and selectively purifying NOx by the reducer, an oxidation catalyst disposed downstream of the NOx catalyst for oxidizing the reducer flowing out from the oxidation catalyst, and an adding means for adding the reducer upstream of the NOx catalyst. The exhaust gas purification apparatus includes a heat value data computing means for computing a heat value data corresponding to a heat value in the oxidation catalyst. Further, the exhaust gas purification apparatus includes a reducer detecting means for detecting at least one of an existence or non-existence of the reducer flowing out from the NOx catalyst and a flowing amount of the reducer.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
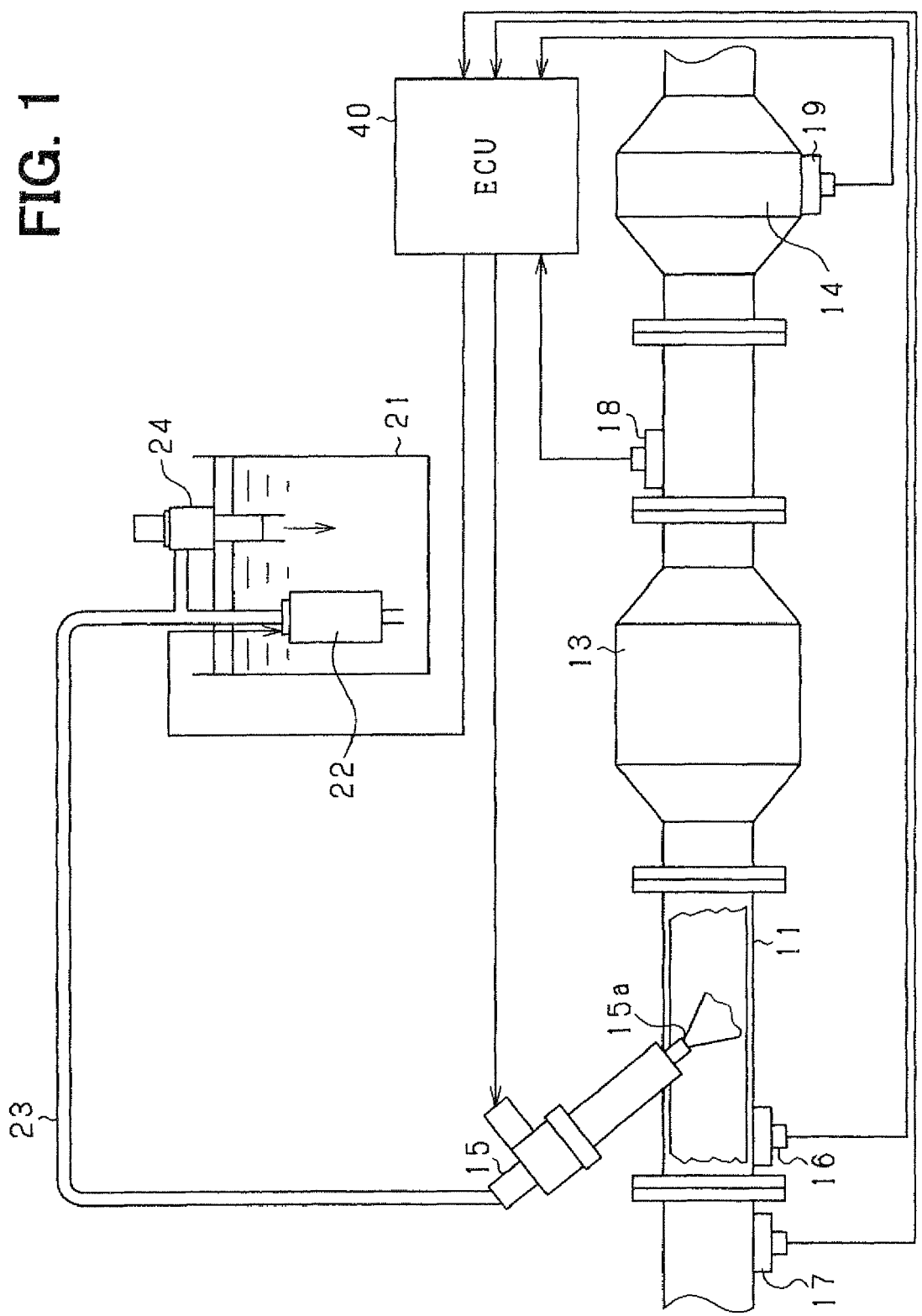
FIG. 1 is a schematic view showing an exhaust gas purifying system.

According to the present embodiment, an exhaust gas purification apparatus purify NOx in exhaust gas by use of a selective catalytic reduction. The exhaust gas purification apparatus is applied to a urea SCR system. Referring to FIG. 1, a configuration of the system will be described. FIG. 1 is a schematic view of a urea SCR system. This urea SCR system purifies an exhaust gas emitted from a diesel engine (not shown). This system includes various actuators, sensors, and an electronic control unit (ECU) 40.

An exhaust pipe 11 is connected to an engine body (not shown). From an upstream of the exhaust pipe 11, a selective catalyst reduction (SCR catalyst) 13 and an ammonia slip catalyst (oxidation catalyst) 14 are disposed in this series. A urea water adding valve 15 for adding urea water into the exhaust pipe 11, an upstream NOx sensor 16 and an exhaust temperature sensor 17 are disposed upstream of the SCR catalyst 13. The urea water is used as reducer. A downstream NOx sensor 18 is disposed downstream of the SCR catalyst 13. The upstream NOx sensor 16 outputs signals indicative of NOx concentration of the exhaust gas upstream of the SCR catalyst 13. The downstream NOx sensor 18 outputs signals indicative of NOx concentration of the exhaust gas downstream of the SCR catalyst 13. The oxidation catalyst 14 is provided with a catalyst temperature sensor 19. The catalyst temperature sensor 19 outputs signals relating to temperature of the oxidation catalyst 14. In the present embodiment, the downstream sensor 18 detects ammonia as well as NOx.

When the emitted exhaust gas flows through the SCR catalyst 13, NOx in the exhaust gas is purified by a reductive reaction with ammonia.

The SCR catalyst 13 expedites the reductive reduction to reduce the NOx.

$$NO+NO_2+2NH_3 \rightarrow 2N_2+3H_2O \tag{1}$$

$$4NO+4NH_3+O_2 \rightarrow 4N_2+6H_2O \tag{2}$$

$$6NO_2+8NH_3 \rightarrow 7N_2+12H_2O \tag{3}$$

Ammonia as reducer is added by the urea water adding valve 15 disposed upstream of the SCR catalyst 13.

The urea water adding valve 15 has a similar configuration to a fuel injector. The urea water adding valve 15 has a driving portion including an electromagnetic solenoid, and a valve body including a needle opening/closing an injection hole. Based on an injection driving signal from the ECU 40, the needle opens/closes the injection hole. That is, when the electromagnetic solenoid is energized, the needle moves to open the injection hole 15a to add (inject) the urea water.

The urea water stored in a urea water tank 21 is supplied to the urea water adding valve 15.

The urea water tank 21 is a closed vessel having a cap. The urea water of which concentration is 32.5% is stored in the urea water tank 21. A urea water pump 22 is provided in the urea water tank 21. The urea water pump 22 is an electric pump which receives a driving signal from the ECU 40. One end of a urea water supply pipe 23 is connected to the urea water pump 22, and the other end of the urea water supply pipe 23 is connected to the urea water adding valve 15. The urea water supply pipe 23 forms a urea water passage therein. When the urea water pump 22 is driven, the urea water is pumped and discharged into the urea water adding valve 15 through the urea water supply pipe 23, The urea water pump 22 is a turbine pump having a plurality of impeller for pumping the urea water. Besides, a pressure regulator 24 is provided to adjust a pressure of the urea water. The discharge pressure of the urea water pump 22 is adjusted by the pressure regulator 24. A filter (not shown) is provided to an outlet of the urea water pump 22 to filter the urea water.

The urea water pump 22 may be a rotor pump or other type pump. The urea water pump may be provided in the urea water supply pipe 23.

The ECU 40 includes a microcomputer. The ECU 40 controls the urea water adding valve 15 and other actuators to execute an exhaust gas purification processing. Specifically, the ECU 40 controls an energization period of the urea water adding valve 15 and a driving amount of the urea water pump 22, whereby an appropriate amount of urea water is added into the exhaust pipe 11 at an appropriate timing.

According to the present embodiment, while the engine is driven, the urea water in the urea water tank 21 is supplied to the urea water adding valve 15 through the urea water supply pipe 23. The urea water is added into the exhaust pipe 11 by the urea water adding valve 15. The urea water and the exhaust gas are supplied to the SCR catalyst 13. In SCR catalyst 13, the reductive reaction of NOx is performed to purify the exhaust gas.

$$(NH_2)2CO+H_2O \rightarrow 2NH_3+CO_2 \tag{4}$$

The urea water is hydrolyzed by the exhaust heat to generate ammonia (NH3). The SCR catalyst 13 adsorbs ammonia. In the SCR catalyst 13, NOx in the exhaust gas is selectively reduced by the ammonia. On the SCR catalyst 13, the reductive reactions (the above formulas (1)-(3)) are conducted to reduce and purify NOx.

A urea water adding control of the urea water adding valve 15 will be described hereinafter. According to the present embodiment, a feedback control of the urea water adding amount is conducted. In the feedback control, an actual ammonia adsorption quantity in the SCR catalyst 13 is computed. The urea water adding amount is controlled so that the actual ammonia adsorption quantity agrees with a target value. The ammonia adsorption quantity computed based on a balance between ammonia supply amount and ammonia consumed amount. The ammonia supply amount is computed based on the urea water adding amount by the urea water adding valve 15. The ammonia consumed amount is computed based on the NOx amount upstream and downstream of the SCR 13. That is, based on the output signal from the upstream NOx sensor 16 and the downstream NOx sensor 18, the NOx amounts upstream and downstream of the SCR catalyst 13 are detected. Then, a difference between upstream NOx amount and downstream NOx amount is computed. Based on the difference between the upstream NOx amount and the downstream NOx amount, that is, based on the NOx amount purified by the SCR catalyst 13, the ammonia consumed amount is computed.

Figure 2:
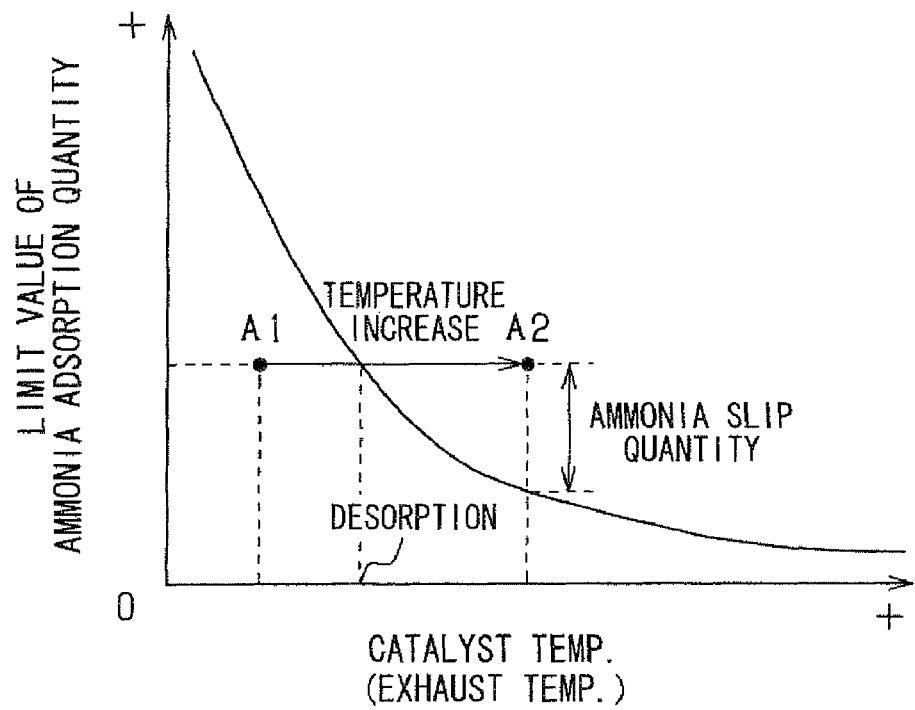
FIG. 2 is a chart showing a relationship between a SCR catalyst temperature and a limit value of an ammonia adsorption quantity.

As shown in FIG. 2, as the SCR catalyst temperature increases, the limit value of the ammonia adsorption quantity becomes small. The limit value of the ammonia adsorption quantity is an upper value in which the ammonia adsorption becomes saturated.

When the temperature of the SCR catalyst 13 increases and the ammonia quantity adsorbed in the SCR catalyst 13 exceeds the limit value, the excess ammonia flows out from the SCR catalyst 13 toward downstream (refer to A1-A2 in FIG. 2). The oxidation catalyst 14 oxidizes the ammonia.

$$4NH_3+3O_2 \rightarrow 2N_2+6H_2O \tag{5}$$

The oxidation catalyst 14 degrades the ammonia into nitrogen (N2) and water (H2O).

When the ammonia amount flowing out from the SCR catalyst 13, which is referred to as ammonia slip quantity, exceeds a capacity of the oxidation catalyst 14, the ammonia flows out from the oxidation catalyst 14.

According to the present embodiment, the computer detects ammonia flowing out from the SCR catalyst 13, ammonia flowing out from the oxidation catalyst 14, and the ammonia slip quantity.

Figure 3:
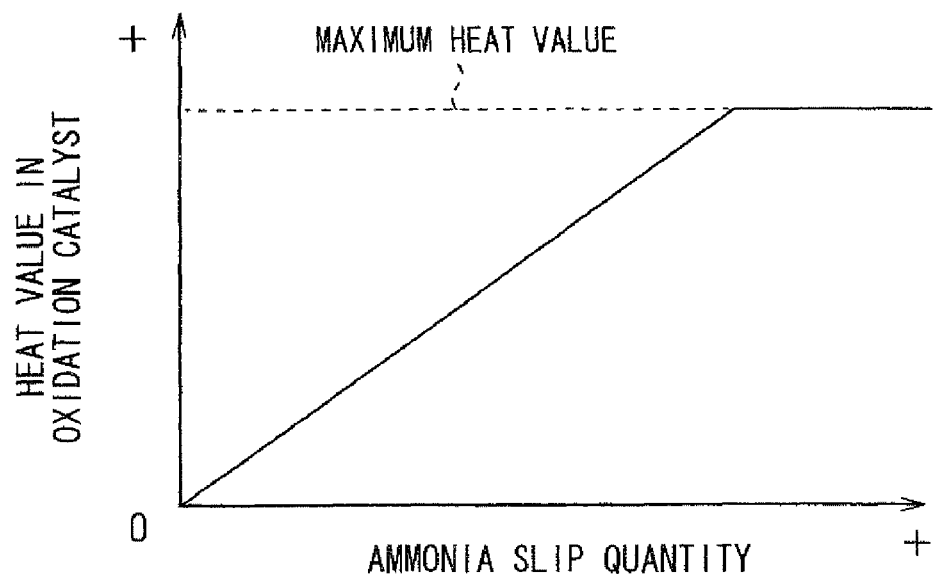
FIG. 3 is a chart showing a relationship between an ammonia slip quantity and heat value in the oxidation catalyst.

As shown in FIG. 3, a heat value at the oxidation catalyst 14 becomes large as the ammonia slip quantity becomes large. When the ammonia slip quantity exceeds the capacity of the oxidation catalyst 14, the heat value at the oxidation catalyst 14 becomes constant. A differential temperature between the oxidation catalyst 14 and the exhaust gas flowing into the oxidation catalyst 14 correlates with the heat value at the oxidation catalyst 14. As shown in following (1)-(3), existence or nonexistence of ammonia slip, existence or nonexistence of ammonia flowing out from the oxidation catalyst 14, and the ammonia slip quantity are detected.

(1) When a differential temperature between the oxidation catalyst 14 and exhaust gas is greater than or equal to a specified value α, it is detected that ammonia flowing out from the SCR catalyst 13 reaches the oxidation catalyst 14 and it is determined that the ammonia slip arises. The specified value α is a differential temperature for determining whether heat is generated due to an oxidation reaction of ammonia.

(2) When a condition in which a differential temperature between the oxidation catalyst 14 and the exhaust gas is greater than or equal to a specified value β continues for a specified time period, it is detected that the oxidation reaction is saturated and that ammonia flows out from the oxidation catalyst 14. The specified value β is a differential temperature corresponding to the maximum heat value of the oxidation catalyst 14.

(3) The ammonia slip quantity is detected based on the differential temperature between the oxidation catalyst 14 and the exhaust gas.

Based on the detection result of the above (1)-(3), following processings (4)-(6) are conducted.

(4) When the ammonia slip is detected, the urea water adding valve 15 increases the adding quantity of urea water. Thus, the ammonia slip is restricted.

(5) When it is detected that ammonia flows out from the oxidation catalyst 14, a specified fail processing is conducted. In the specified fail processing, the urea water adding valve 15 restricts an adding amount of the urea water, a malfunction indicator lump is turned on to indicate that the urea SCR system has malfunction, or a diagnosis data is stored in a backup memory (EEPROM). Thus, it is restricted that ammonia flows out from the oxidation catalyst 14.

(6) According to the detected ammonia slip quantity, the NOx amount detected by the downstream NOx sensor 18 is corrected. As described above, the NOx sensor detects ammonia as well as NOx. If ammonia flows out from the SCR catalyst 13, the output signal of the downstream NOx sensor 18 indicates larger value than the actual NOx amount. Thus, the NOx amount is corrected to be reduced, and the NOx amount downstream of the SCR catalyst 13 can be accurately computed, Especially, according to the present embodiment, the ammonia consumed amount can be correctly computed, whereby the feedback control of the urea water adding amount can be well performed.

Figure 4:
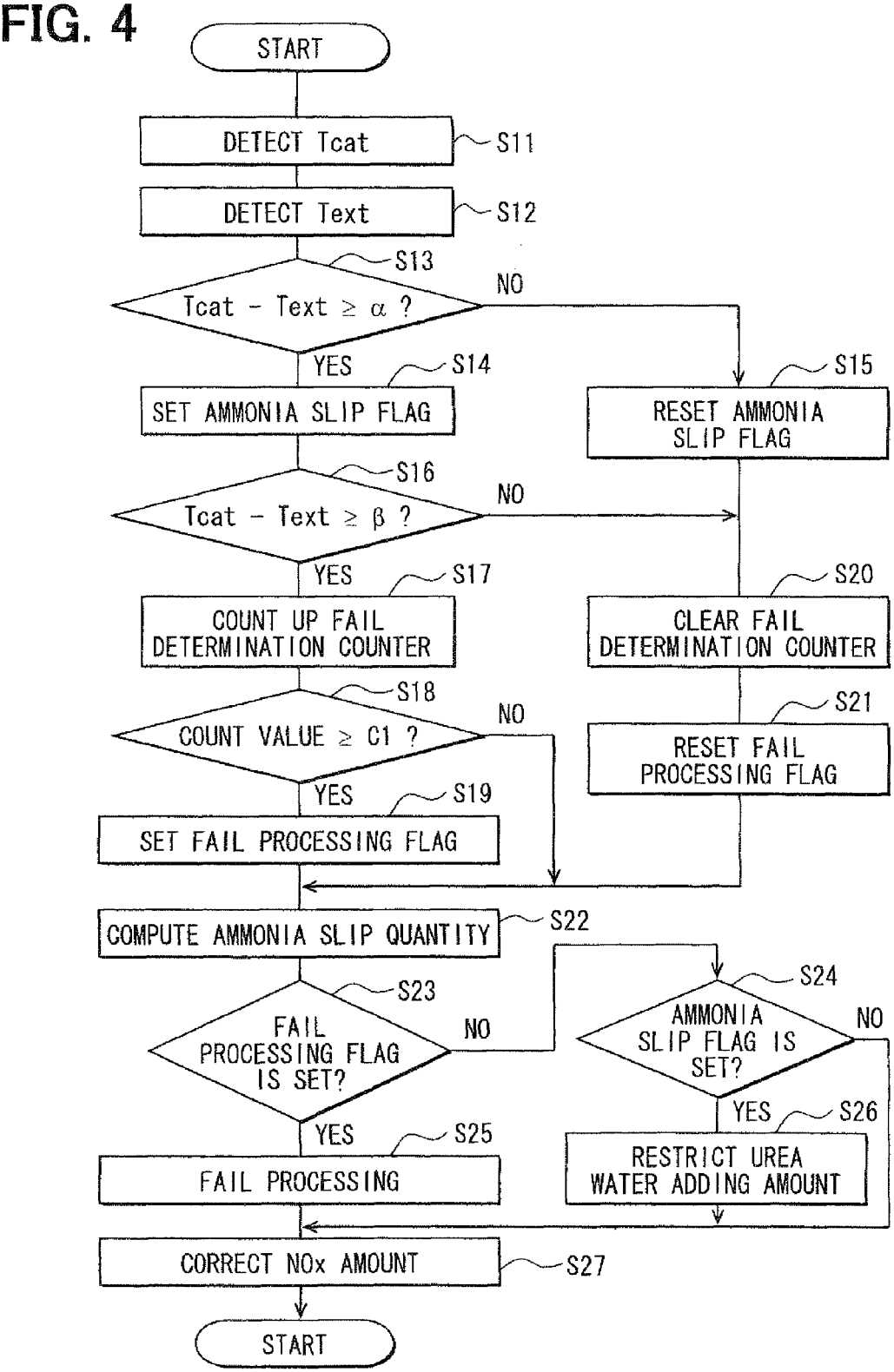
FIG. 4 is a flowchart showing an ammonia detecting program.

Referring to FIG. 4, an ammonia detection process will be described hereinafter. FIG. 4 is a flowchart showing an ammonia detection program. This program is executed in a specified interval.

In step S11, the ECU 40 detects a catalyst temperature "Tcat" of the oxidation catalyst 14 based on the output signal of the catalyst temperature sensor 19. In step S12, the ECU 40 detects exhaust temperature "Text" of the exhaust gas flowing into the oxidation catalyst 14.

In step S13, the ECU 40 determines whether the ammonia slip occurs based on the catalyst temperature "Tcat" and the exhaust temperature "Text". Specifically, the ECU 40 subtracts the exhaust temperature "Text" from the catalyst temperature "Tcat". When the differential temperature is greater than or equal to the specified value α, it is determined that the ammonia slip occurs. When the answer is Yes in step S13, the procedure proceeds to step S14 in which an ammonia slip flag is set. Then, the procedure proceeds to step S16. When the answer is No in step S13, the procedure proceeds to step S15 in which the ammonia slip flag is reset. Then, the procedure proceeds to step S20.

In steps S16-S21, the ECU 40 determines whether ammonia flows out from the oxidation catalyst 14.

Specifically, in step S16, the ECU 40 determines whether differential temperature between the catalyst temperature "Tcat" and the exhaust temperature "Text" is greater than or equal to the specified value β.

When the answer is Yes in step S16, the procedure proceeds to step S17 in which a fail determination counter is counted up. Then the procedure proceeds to step S18. The fail determination counter counts a continuous period in which the differential temperature between "Tcat" and "Text" is greater than or equal to the specified value β. In step S18, the ECU 40 determines whether count value of the fail determination counter is greater than or equal to a threshold C1. When the answer is Yes in step S18, the procedure proceeds to step S19 in which a fail processing flag is set. Then, the procedure proceeds to step S22. When the answer is No in step S18, the procedure proceeds to step S22, When the answer is No in step S16, the procedure proceeds to step S20 in which the fail determination counter is cleared. In step S21, the fail processing flag is reset. Then, the procedure proceeds to step S22.

In step S22, the ECU 40 computes the ammonia slip quantity based on the catalyst temperature "Tcat" and exhaust temperature "Text". For example, a relationship between the "Tcat", "Text" and ammonia slip quantity is obtained by experiments. A map showing this relationship is stored in a memory beforehand. As the difference between "Tcat" and "Text" becomes large, the ammonia slip quantity is increased in this map. The ECU 40 computes the ammonia slip quantity based on this map.

In steps S23-S26, the ECU 40 executes processings according to an ammonia slip flag and the fail processing flag.

In step S23, the ECU 40 determines whether the fail processing flag is set. In step S24, the ECU 40 determines whether the ammonia slip flag is set. When the answer is Yes in step S23, the procedure proceeds to step S25 in which the above fail processings are conducted. Then, the procedure proceeds to step S27. When the answer is Yes in step S24, the procedure proceeds to step S26 in which the urea water adding amount is restricted. Then, the procedure proceeds to step S27. When it is determined that ammonia slip flag and fail processing flag are not reset, the procedure proceeds to step S27.

In step S27, the ECU 40 corrects the detected NOx amount to be reduced according to the ammonia slip quantity computed in step S22. A map showing a relation between the ammonia slip amount and the correction amount is stored in a memory. In this map, as the ammonia slip increases, the correction amount increases. The ECU 40 corrects the NOx amount by use of the map.

According to the present embodiment, following advantage can be obtained.

The existence or nonexistence of the ammonia slip, the ammonia slip quantity, and the existence or non existence of the ammonia flowing out from the oxidation catalyst are detected based on two parameters, that is, the catalyst temperature "Tcat" and exhaust temperature "Text". Since only two parameters are necessary to detect the ammonia, the errors of the parameters are restricted. Thus, the existence or nonexistence of the ammonia slip, the ammonia slip quantity, and the existence or non existence of the ammonia flowing out from the oxidation catalyst can be correctly detected.

The ammonia is detected based on the catalyst temperature "Tcat" and the exhaust temperature "Text". The differential temperature between the catalyst temperature "Tcat" and the exhaust temperature "Text" even the heat value of the oxidation catalyst 14. Thus, the detection accuracy of the ammonia can be improved.

Other Embodiment

The present invention is not limited to the embodiments described above, but may be performed, for example, in the following manner.

Ammonia flowing out from the SCR catalyst 13 can be detected as follows. That is, a relationship between the temperature of the oxidation catalyst 14, the temperature of the exhaust gas flowing into the oxidation catalyst 14, and the heat value of the oxidation catalyst 14 is obtained by experiment. A map showing this relationship is stored in a memory. Based on this map, the heat value of the oxidation catalyst 14 is derived from the temperature of the oxidation catalyst 14 and the temperature of the exhaust gas flowing into the oxidation catalyst 14. Then, the ammonia flowing out from the SCR catalyst 13 is detected based on the derived heat value. Also in this case, the same advantage as the above embodiment can be obtained.

It is conceivable that the heat value of the oxidation catalyst 14 varies according to exhaust temperature and exhaust velocity even if the ammonia amount flowing out from the SCR catalyst is not changed. Thus, it is preferable that the ammonia slip quantity is detected based on the exhaust temperature and the exhaust velocity.

For example, even if the ammonia slip quantity is constant, as the exhaust temperature is smaller, the oxidized ammonia amount becomes smaller. Thus, the heat value of the oxidation catalyst 14 becomes small. As the exhaust temperature flowing into the oxidation catalyst 14 becomes smaller, the heat value of the oxidation catalyst 14 relative to the ammonia slip quantity becomes smaller. As the temperature of the exhaust gas flowing into the oxidation catalyst 14 is lower, the specified value a is set smaller. As the temperature of the exhaust gas flowing into the oxidation catalyst 14 is lower, the ammonia slip quantity is corrected to be increased. Thus, the detection accuracy of the ammonia can be improved.

Even if the ammonia slip quantity is constant, as the exhaust velocity is higher, the oxidized ammonia amount becomes smaller. Thus, the heat value of the oxidation catalyst 14 becomes small. As the exhaust velocity flowing into the oxidation catalyst 14 becomes higher, the heat value of the oxidation catalyst 14 relative to the ammonia slip quantity becomes smaller. As the velocity of the exhaust gas flowing into the oxidation catalyst 14 is higher, the specified value a is set smaller. As the velocity of the exhaust gas flowing into the oxidation catalyst 14 is higher, the ammonia slip quantity is corrected to be increased. Thus, the detection accuracy of the ammonia can be improved.

Temperature of the exhaust gas flowing into the oxidation catalyst 14 and temperature of the exhaust gas flowing out from the oxidation catalyst 14 are detected. The ammonia detection processing can be conducted based on the differential temperature. Also in this case, the same advantage as the above embodiment can be obtained.

When a temperature distribution is not even in the oxidation catalyst 14, the temperature of the exhaust gas flowing into the oxidation catalyst 14 and the temperature of the exhaust gas flowing out from the oxidation catalyst 14 correlates with the heat value. In such a case, the ammonia flowing out from the SCR catalyst 13 can be detected based on the temperature of the exhaust gas flowing into the oxidation catalyst 14 and the temperature of the exhaust gas flowing out from the SCR catalyst 14. Thus, the detection accuracy of the ammonia flowing out from the SCR catalyst 13 can be improved.

Figure 5:
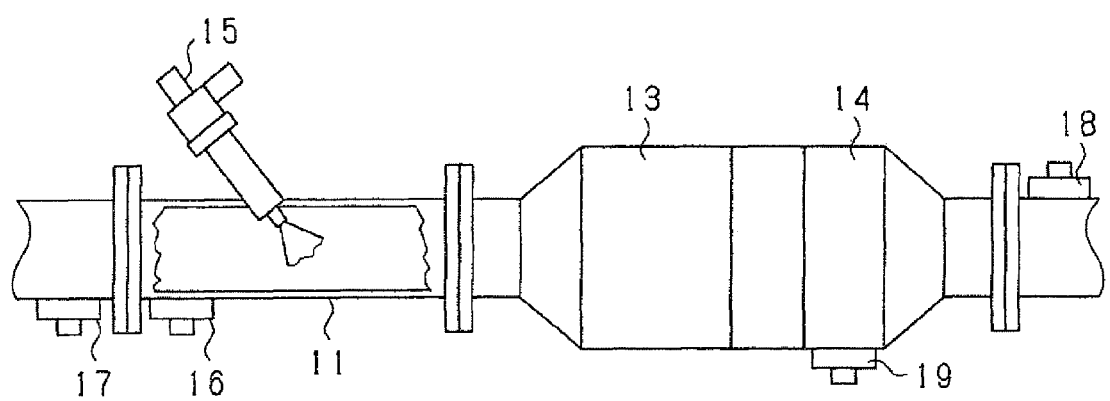
FIG. 5 is a schematic view showing an exhaust gas purifying system according to another embodiment.

The present invention can be applied to another type urea SCR system For example, as shown in FIG. 5, the downstream NOx sensor 18 may be disposed downstream of the oxidation catalyst 14. Since it is restricted that the ammonia flows out from the oxidation catalyst 14, a detection value error of the downstream NOx sensor 18 can be reduced. Besides, urea water or ammonia can be generated from a solid urea as the reducer. The ammonia can be applied to the exhaust pipe. A reducer other than ammonia can be used.

What is claimed is:

1. An exhaust gas purification apparatus for an internal combustion engine, applied to an exhaust purification system including a NOx catalyst adsorbing a reducer and selectively purifying NOx by the reducer, an oxidation catalyst disposed downstream of the NOx catalyst for oxidizing the reducer flowing out from the NOx catalyst, and an adding means for adding the reducer upstream of the NOx catalyst, the exhaust gas purification apparatus comprising:
a heat value data computing means for computing a heat value data corresponding to a heat value in the oxidation catalyst;
a reducer detecting means for detecting at least one of an existence or nonexistence of the reducer flowing out from the NOx catalyst and a flowing amount of the reducer; and
an exhaust temperature detecting means for detecting a temperature of the exhaust gas flowing into the oxidation catalyst, wherein
as the temperature of the exhaust gas is lower, a threshold of the heat value data for detecting an existence or non-existence of the reducer is made smaller, or a flowing out amount of the reducer corresponding to the heat value data is made larger.

2. An exhaust gas purification apparatus according to claim 1, further comprising:
a velocity detecting means for detecting a velocity of the exhaust gas flowing into the oxidation catalyst, wherein
as the velocity of the exhaust gas is higher, a threshold of the heat value data for detecting an existence or nonexistence of the reducer is made smaller, or a flowing out amount of the reducer corresponding to the heat value data is made larger.

3. An exhaust gas purification apparatus according to claim 1, further comprising:
a gas sensor detecting NOx and reducer between the NOx catalyst and the oxidation catalyst;
a NOx amount computing means for computing a NOx amount in the exhaust gas flowing out from the NOx catalyst based on a detection value of the gas sensor; and
a NOx amount correction means for correcting a NOx amount based on an amount of the reducer flowing out from the NOx catalyst.

4. An exhaust gas purification apparatus according to claim 1, wherein
the heat value data computing means computes a differential temperature between a temperature of the exhaust gas flowing into the oxidation catalyst and a temperature of the exhaust gas flowing out from the oxidation catalyst or a temperature of the oxidation catalyst, and
the reducer detecting means detects the reducer based on the differential temperature computed by the heat value computing means.

5. An exhaust gas purification apparatus for an internal combustion engine, applied to an exhaust purification system including a NOx catalyst adsorbing a reducer and selectively purifying NOx by the reducer, an oxidation catalyst disposed downstream of the NOx catalyst for oxidizing the reducer flowing out from the NOx catalyst, and an adding means for adding the reducer upstream of the NOx catalyst, the exhaust gas purification apparatus comprising:

a heat value data computing means for computing a heat value data corresponding to a heat value in the oxidation catalyst;

a reducer detecting means for detecting at least one of an existence or nonexistence of the reducer flowing out from the NOx catalyst and a flowing amount of the reducer; and a velocity detecting means for detecting a velocity of the exhaust gas flowing into the oxidation catalyst, wherein as the velocity of the exhaust gas is higher, a threshold of the heat value data for detecting an existence or nonexistence of the reducer is made smaller, or a flowing out amount of the reducer corresponding to the heat value data is made larger.

6. An exhaust gas purification apparatus for an internal combustion engine, applied to an exhaust purification system including a NOx catalyst adsorbing a reducer and selectively purifying NOx by the reducer, an oxidation catalyst disposed downstream of the NOx catalyst for oxidizing the reducer flowing out from the NOx catalyst, a gas sensor detecting NOx and reducer between the NOx catalyst and the oxidation catalyst, and an adding means for adding the reducer upstream of the NOx catalyst, the exhaust gas purification apparatus comprising:

a heat value data computing means for computing a heat value data corresponding to a heat value in the oxidation catalyst;

a reducer detecting means for detecting a flowing amount of the reducer based on the heat value data computed by the heat value data computing means;

a NOx amount computing means for computing a NOx amount in the exhaust gas flowing out from the NOx catalyst based on a detection value of the gas sensor; and a NOx amount correction means for correcting a NOx amount based on an amount of the reducer flowing out from the NOx catalyst; and an exhaust temperature detecting means for detecting a temperature of the exhaust gas flowing into the oxidation catalyst, wherein as the temperature of the exhaust gas is lower, a threshold of the heat value data for detecting an existence or nonexistence of the reducer is made smaller, or a flowing out amount of the reducer corresponding to the heat value data is made larger.

* * * * *